UNITED STATES PATENT OFFICE.

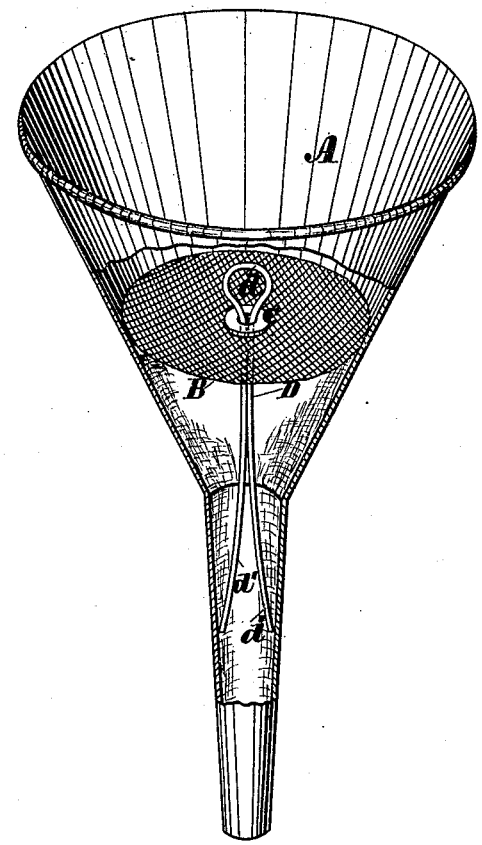

DANIEL D. PAUL AND JOHN G. RAMER, OF PHILADELPHIA, PENNSYLVANIA.

IMPROVEMENT IN FUNNEL-FILTERS.

Specification forming part of Letters Patent No. 180,368, dated July 25, 1876; application filed March 4, 1876.

*To all whom it may concern:*

Be it known that we, DANIEL D. PAUL and JOHN G. RAMER, of Philadelphia, in the county of Philadelphia and State of Pennsylvania, have invented certain new and useful Improvements in Funnel-Filters; and do hereby declare the following to be a full, clear, and exact description of the invention, such as will enable others skilled in the art to which it pertains to make and use it, reference being had to the accompanying drawing, which forms part of this specification, and which is a broken perspective of a funnel with my improved filter applied.

The object of our invention is to provide a funnel-filter of cheap and simple construction, which can be readily inserted and withdrawn, and which, when in place, will be retained firmly and without danger of accidental displacement.

The nature of our invention consists in the peculiar construction and arrangement of parts, as hereinafter more fully described, having reference particularly to the provision of a bent rod, which serves the double purpose of a spring for retaining the filter in position, and of a handle for withdrawing the same from the funnel, when withdrawal is necessary for cleaning purposes.

Referring to the accompanying drawing, A designates a funnel with our improved filter applied. B represents a disk of wire-gauze, the outer edge of which should be bound or seamed, to prevent breaking or rupture. C shows a central metallic washer, through which passes a bent spring-rod, D. The upper part of this rod forms a loop, $d$, which serves as a handle. The two lower ends $d'$ $d'$ of the rod D are curved outwardly, so as to impinge against the neck of the funnel, thereby keeping the filter in place. The extremities of the rods $d'$ $d'$ terminate abruptly, forming sharp corners, so as to adhere to the sides of the funnel-neck, and preventing the accidental movement of the filter within said funnel.

What we claim as our invention is—

As a new article of manufacture, the funnel-filter herein described, consisting of the wire-gauze disk B, central washer C, and rod D, bent to form the handle $d$, and flaring legs $d'$ $d'$, constructed and arranged for operation, substantially as shown and described.

In testimony that we claim the foregoing we have hereunto set our hands this 25th day of February, 1876.

DANIEL D. PAUL.
JOHN G. RAMER.

Witnesses:
M. DANL. CONNOLLY,
JNO. A. BELL.